Figure 1:
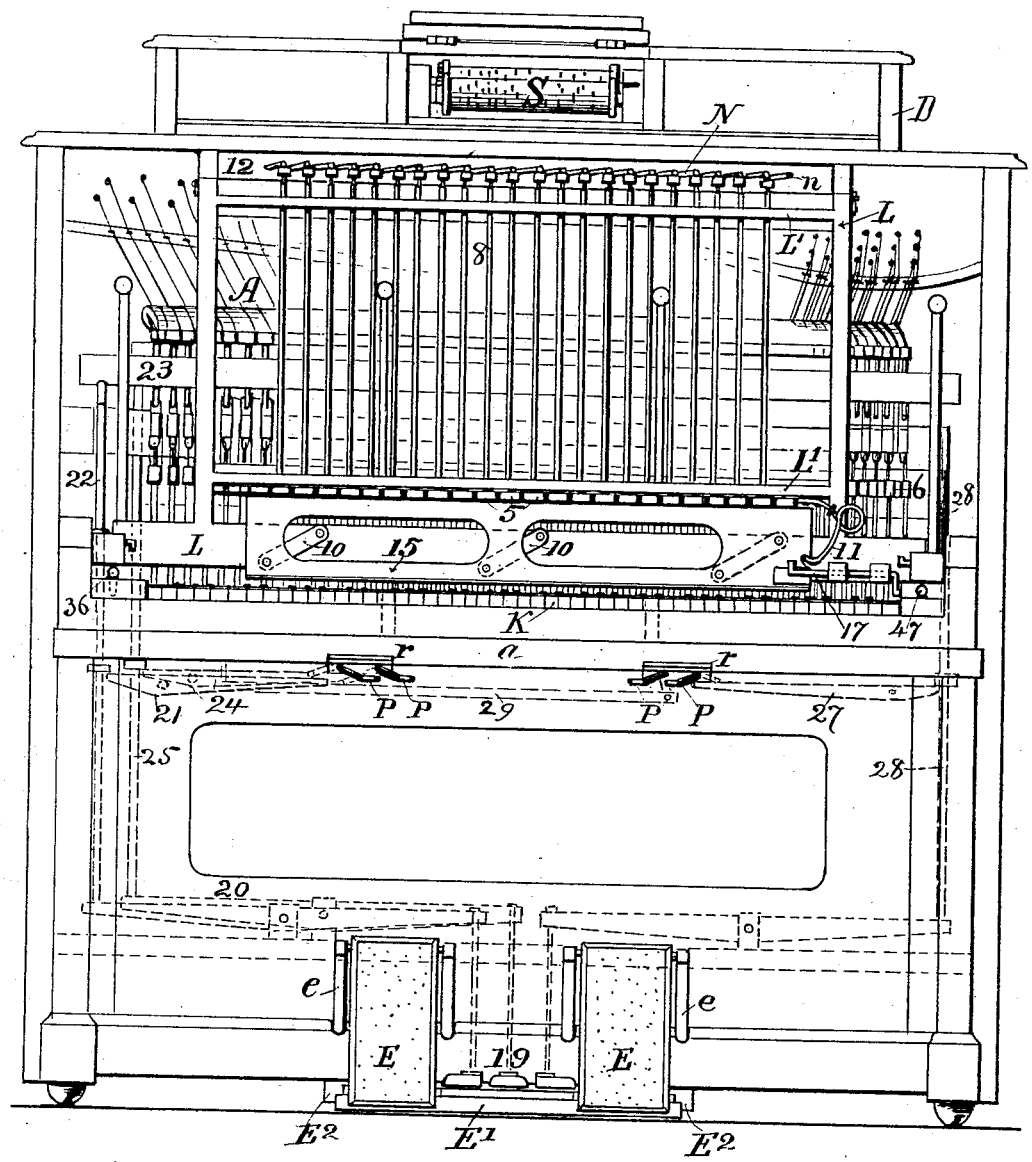

(No Model.)　　　　　　W. D. PARKER.　　　　7 Sheets—Sheet 1.
AUTOMATIC PIANO.

No. 560,303.　　　　　　　　　　Patented May 19, 1896.

Witnesses.　　　　　　　　　　Inventor.
　　　　　　　　　　　　　William D. Parker
　　　　　　　　　　　By Chas. H. Burleigh
　　　　　　　　　　　　　　　Attorney (No Model.) 7 Sheets—Sheet 2.
W. D. PARKER.
AUTOMATIC PIANO.

No. 560,303. Patented May 19, 1896.

Witnesses.  Inventor.
  William D. Parker
  By Chas. H. Burleigh
  Attorney

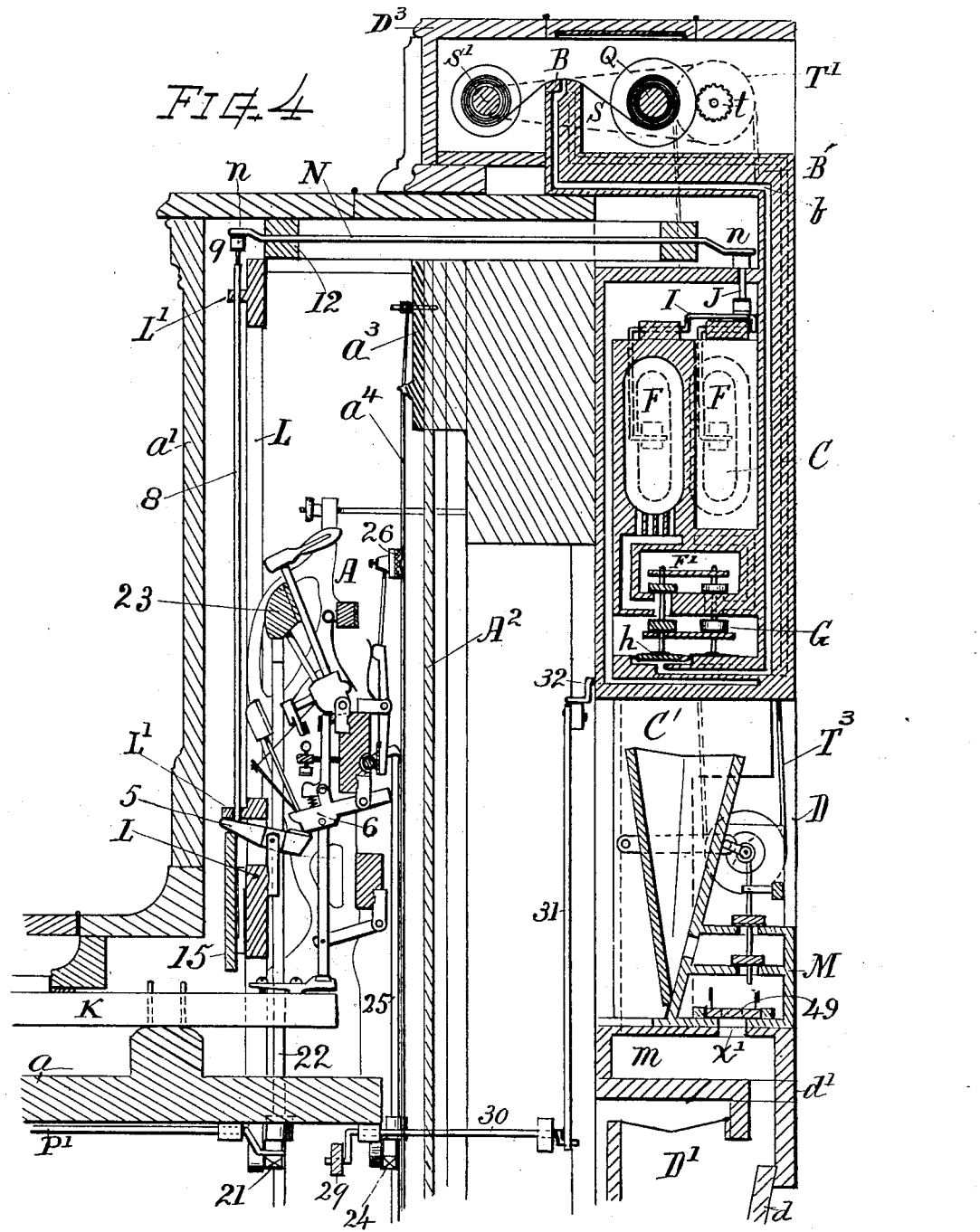

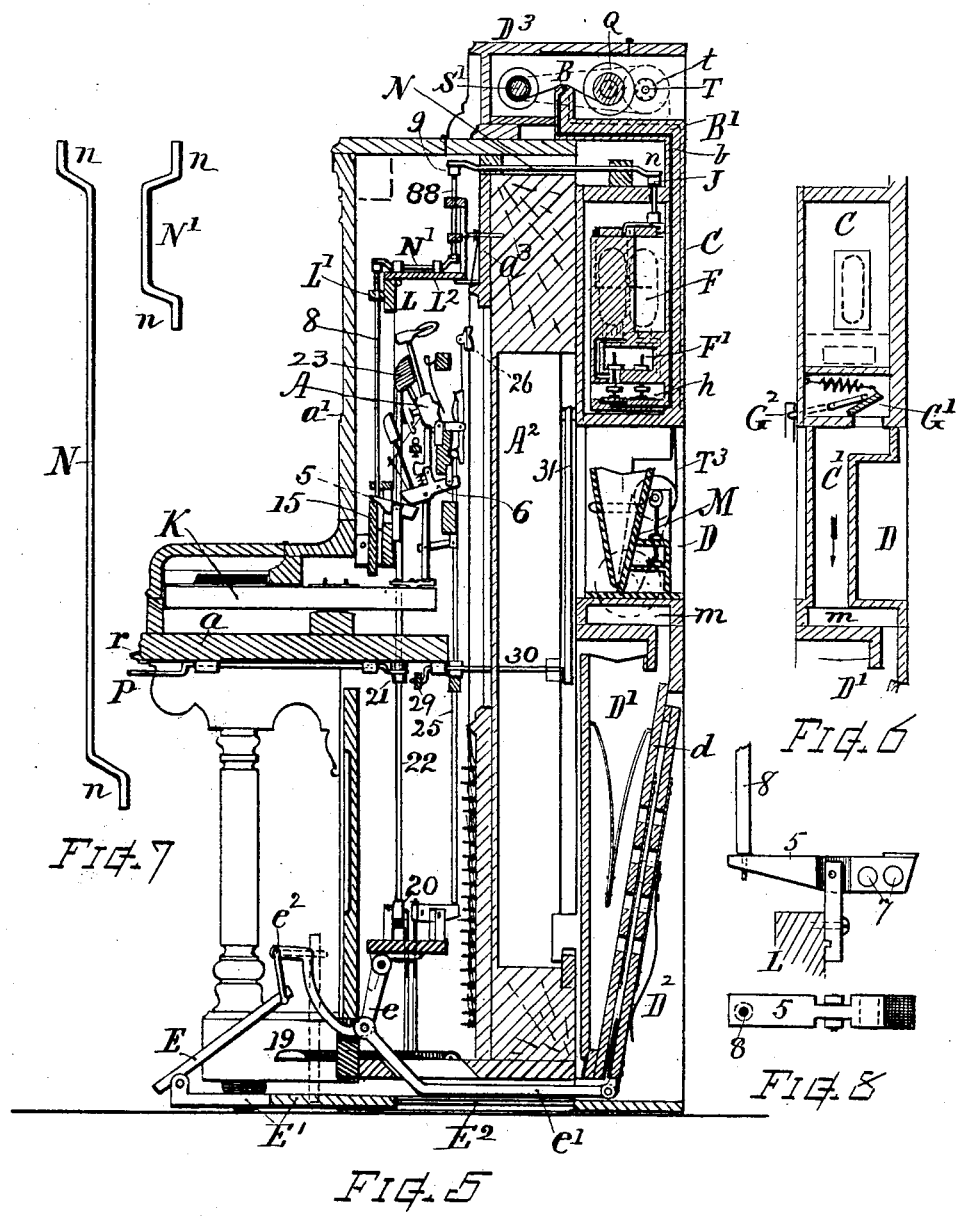

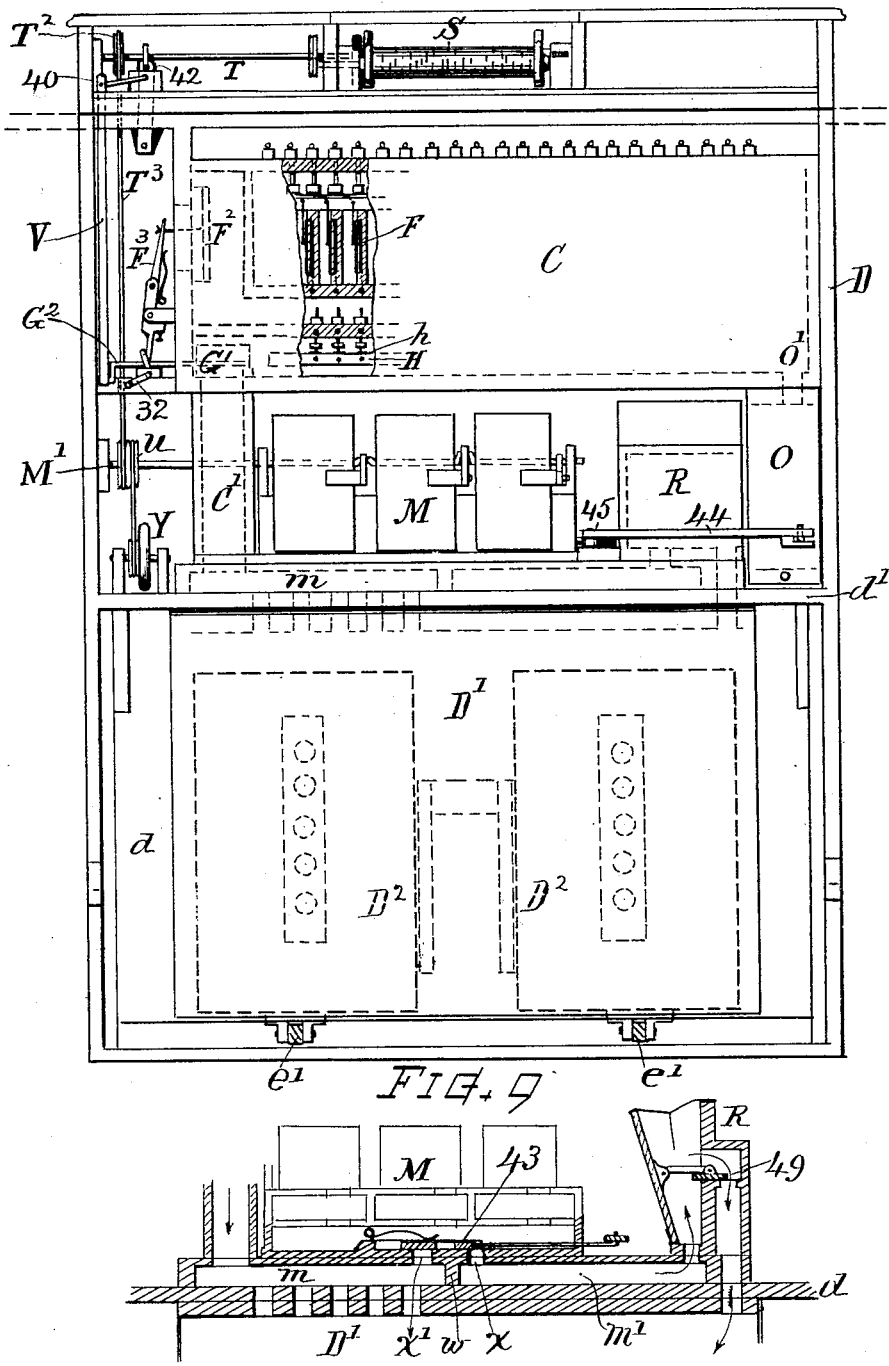

(No Model.) 7 Sheets—Sheet 6.
W. D. PARKER.
AUTOMATIC PIANO.
No. 560,303. Patented May 19, 1896.
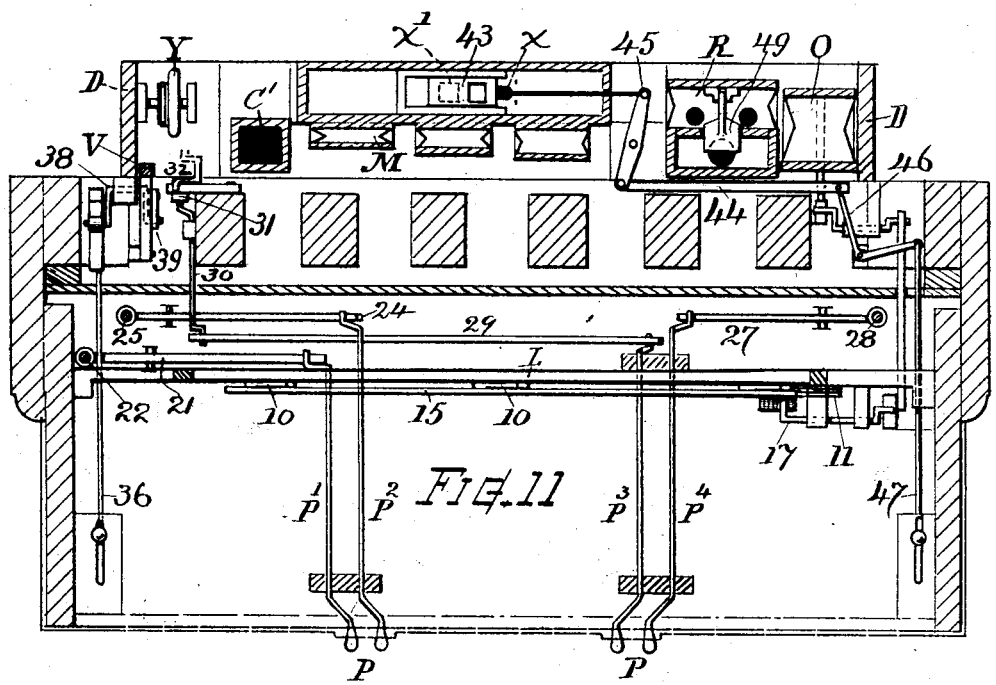
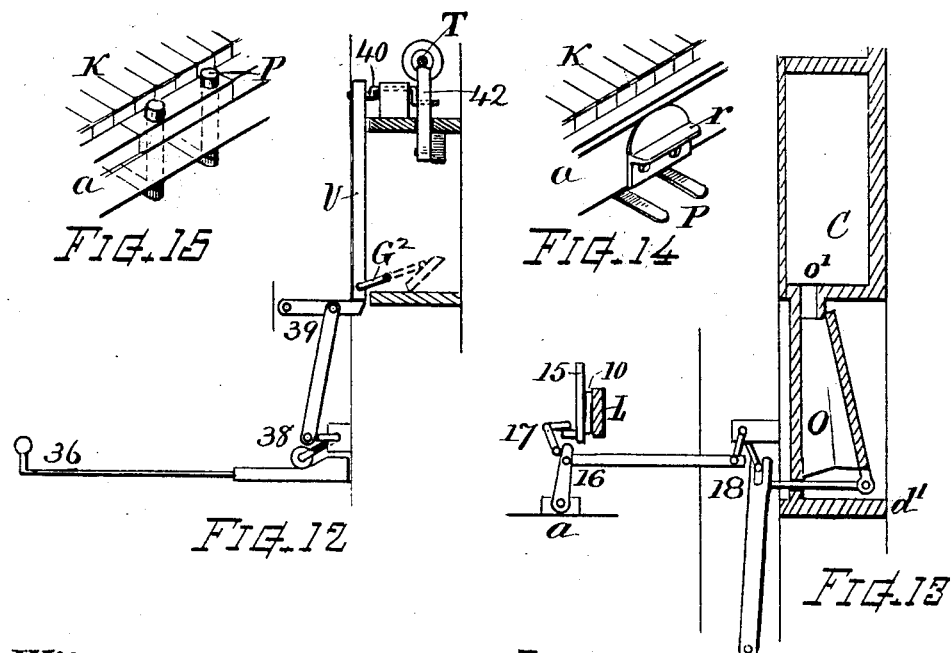
Witnesses.
Inventor.
William D. Parker
By Chas. H. Burleigh
Attorney (No Model.) 7 Sheets—Sheet 7.
W. D. PARKER.
AUTOMATIC PIANO
No. 560,303. Patented May 19, 1896.
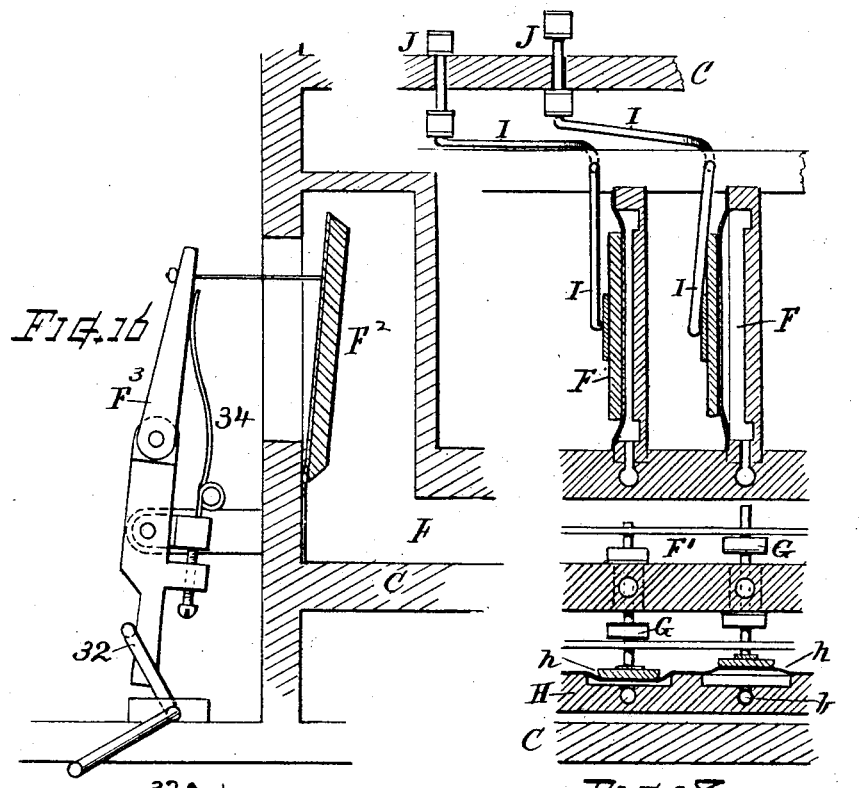
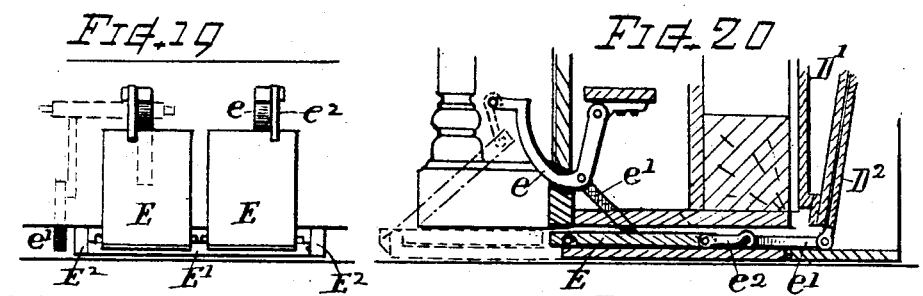
Witnesses.
N. W. Barton
Charles A. Bacon
Inventor.
William D. Parker
By Chas. H. Burleigh
Attorney

UNITED STATES PATENT OFFICE.

WILLIAM D. PARKER, OF MERIDEN, CONNECTICUT, ASSIGNOR OF THREE-FOURTHS TO EDWARD H. WHITE, OF SAME PLACE.

AUTOMATIC PIANO.

SPECIFICATION forming part of Letters Patent No. 560,303, dated May 19, 1896.

Application filed June 14, 1895. Serial No. 552,763. (No model.)

*To all whom it may concern:*

Be it known that I, WILLIAM D. PARKER, a citizen of the United States, residing at Meriden, in the county of New Haven and State of Connecticut, have invented new and useful Improvements in Automatic Pianos, of which the following, together with the accompanying drawings, is a specification sufficiently full, clear, and exact to enable persons skilled in the art to which this invention appertains to make and use the same.

This invention relates to improved construction in combination-pianos, or that class of instruments (an example of which is described in Letters Patent No. 470,323, heretofore granted me) adapted for either manual or automatic operation.

The object of the present invention is to provide a piano having manual playing mechanism, with a system of automatic operators disposed above the manual and within the piano-case, in front of the piano-action, with automatic keys engaging the rockers or tilting parts that carry the hammer-throwing jacks in a manner for playing the hammers independent of the manual-keys, and disconnected, so as not to interfere with the use of the manual for playing.

Another object is to provide a piano with an automatic action above the manual and in front of the piano-action, a pneumatic actuating mechanism at the back of the piano, and means for transmitting motion across the piano-frame from said pneumatic actuating mechanism to the action in front.

Another object is to provide a locking device for preventing movement of the manual-keys while the automatic action is operating, and for retaining the latter and freeing the manual-keys when the automatic action is not in use; also, to provide means for automatically operating the key-locking device.

Another object is the arrangement of the pneumatic playing mechanism and music-carrying and wind-inducing appliances in a manner of convenient assemblage and portability for ready attachment to pianos of separate manufacture as well as to those specially made therefor.

Another object is to provide finger-keys at the front of the manual or key table, whereby the expression mechanism can be conveniently controlled by finger movement while the blow-pedals and automatic action are in use.

Minor objects and features of this invention will be understood from the following detailed description, the particular subject-matter claimed being hereinafter definitely specified.

Figure 2:
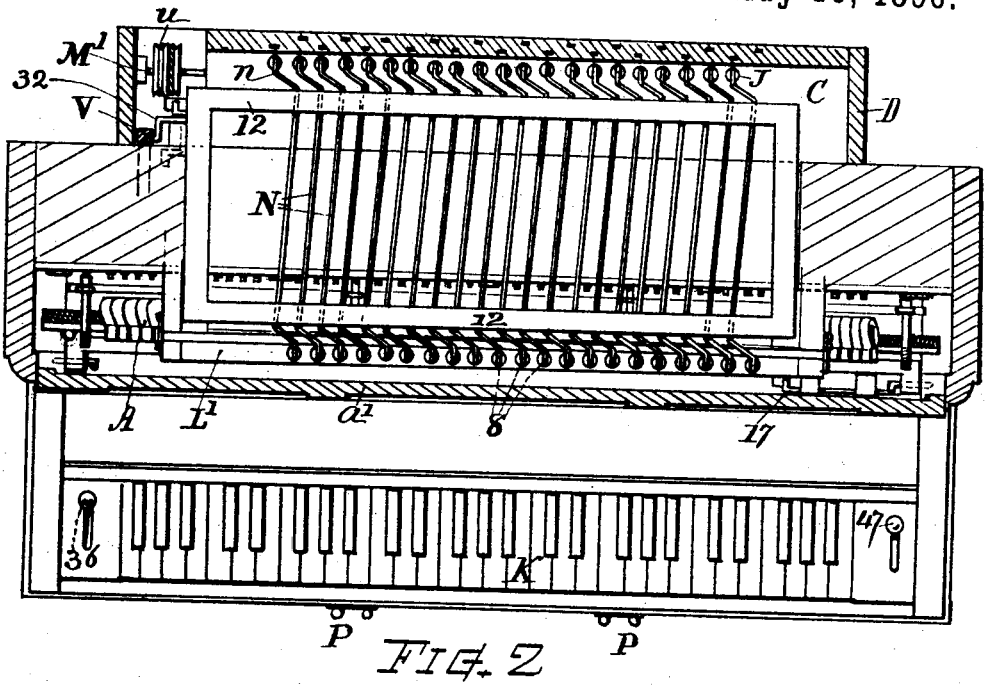
Figure 3:
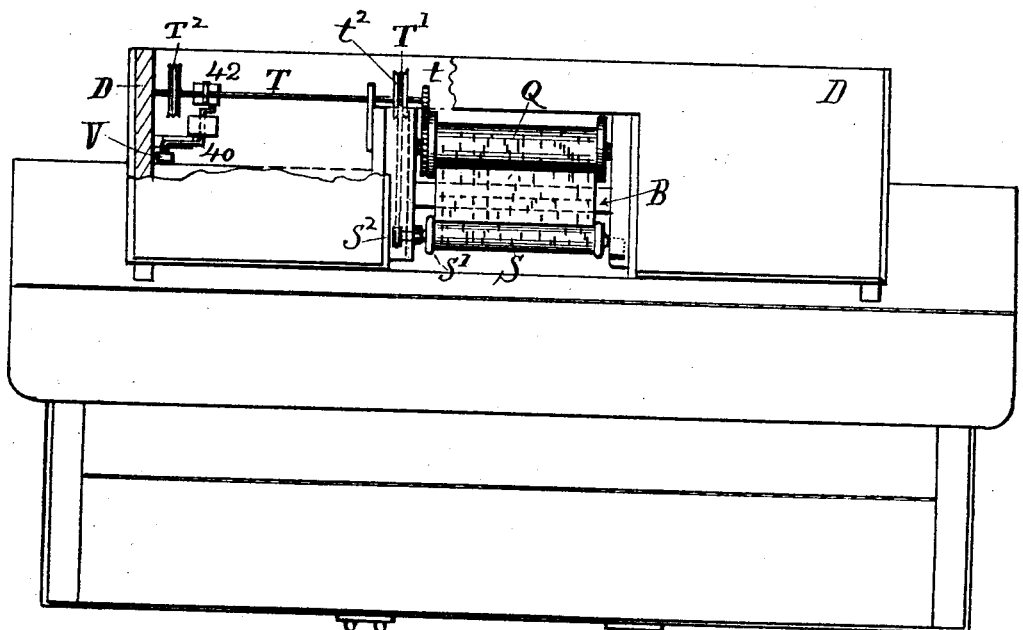

In the drawings, Figure 1 is a front view of the piano with the desk-front removed, showing the action. Fig. 2 is a horizontal section below the top board of the piano-case. Fig. 3 is a plan view with a portion of the attachment-top broken away to show the music-carrying mechanism. Fig. 4 is a vertical section on somewhat larger scale, showing the piano-action, automatic action, and operating mechanisms. Fig. 5 is a vertical section through the full height of the instrument. Fig. 6 is a section showing the exit-valve and air-trunk from the pneumatic chamber. Fig. 7 shows the form of wires or levers for transmitting motion to the automatic-key operators. Fig. 8 shows a plan and side elevation of the automatic key. Fig. 9 is a front view of the attachable frame and appliances for working the automatic action shown separate from the piano, portions of the front being broken away to reveal the parts beneath. Fig. 10 is a longitudinal vertical section illustrating the improved motor-controlling valve and regulator. Fig. 11 is a horizontal section showing the various operating connections and the finger-keys for controlling expression. Fig. 12 is a side view of the connections for controlling the rewinding mechanism. Fig. 13 is a vertical section showing the pneumatic and connections for operating the key-lock. Fig. 14 is a perspective view of a portion of the front of the keyboard, showing the finger-keys for controlling the expression mechanism. Fig. 15 is a similar view showing a modification in the construction of such finger-keys. Fig. 16 is a sectional view showing details of the resistance-lever and inlet-valve for the pneumatic chest. Fig. 17 is a front view of the connections for controlling said inlet-valve. Fig. 18 is a vertical section illustrating the construction and operation of the pneumatics. Figs. 19 and 20 are front and section views showing a modification in the blow-pedals.

In this improved combination-piano the piano-action A, the manual-keys, the metal frame, sound-board, strings, and body-casing can be of any suitable or well-known construction, and arranged for operation as usually employed in upright pianos.

The term "piano-action," as used in this specification and the claims, is intended to include the group of operating parts above the manual-key for producing the stroke upon the string and effecting recoil of the hammer, comprising the hammer, its throwing-jack, rocker, back-catch, springs, trip device, martingale, and lift-bar, and the connecting-joints for such parts; the same being usually employed in upright pianos, are thus referred to in a group for abridgment of description.

D denotes a frame adapted for attachment to the back of the piano-body and having a top portion that extends above or surmounts the top of the piano. Within this top portion, preferably at a central position, there is arranged the tracker B and appliances for supporting and carrying forward the perforated music-sheet S, which parts rest upon a horizontal channel-board B'. The wind-chest or pneumatic chamber C, containing the series of controlling-pneumatics $h$ and operating-pneumatics F, is disposed within the upper part of the frame D, behind the top beam of the piano-back. Below said wind-chest is arranged the motor or air-engine M, which generates power and motion for operating the music-winding rolls, also the regulator R therefor. The motor and regulator are supported by a shelf $d'$, that extends across the frame and carries a wind-chest that communicates with the motor and other parts, as more fully hereinafter described.

In the lower portion of the frame D there is the wind-inducing mechanism consisting of the bellows D' and its exhausting-feeders $D^2$, which are worked by swinging pedals E, located at the front of the piano-case, and connected with the lower edge of said exhausters by hinged sector-levers $e$ and connecting-rods $e'$, as indicated. The bellows-board $d$ extends across and is rigidly fixed in the frame D, while the movable parts of the bellows and exhausters are arranged thereon for operating in the manner of well-known organ-bellows to exhaust the air from the chest C and $m$ through suitable passages communicating therewith.

The device for carrying the music-sheet S' consists of a winding-drum Q in rear of the tracker and suitable bearings for the introduction of a music-spool S' in front of the tracker. Said winding-drum is provided with a gear that is operated by a pinion $t$, fixed on a shaft T, supported in bearings in the upper part of the frame D, as illustrated. Said shaft is provided with a pulley T', from which a belt $t^2$ of coiled wire extends to a small pulley on the spool-bearing $S^2$ for rewinding the music-sheet when the gear and pinion $t$ are thrown out of engagement. A pulley $T^2$ is fixed on the shaft for the driving-belt. A hinged cover is provided for covering the recess in the top of the frame, within which the music-sheet is arranged, as shown at $D^3$, and said cover can be provided with a mirror on its under side to enable the player the better to observe the operations of the sheet.

The pneumatics F and $h$ within the chest C are constructed and arranged to operate substantially as heretofore described in my above-named Letters Patent, the controlling-pneumatic $h$ raising or dropping the valve G accordingly as the air-duct leading thereto from the tracker B is opened or closed by the music-sheet, thereby controlling the flow of air from the inlet-leader F' to inflate or stopping the flow to collapse the operating-pneumatics F, which, by means of their angle-levers I, raise or drop the puppet-studs J, the operation or inflation of the pneumatic F being effected to throw up a puppet J whenever an opening in the music-sheet passes over a corresponding duct in the tracker, and to collapse and drop the puppet when such tracker-duct is closed by the music-sheet. The ducts $b$ from the tracker radiate within the horizontal channel-board B', and then pass downward within the back-board of the chest C to the bed H and into the respective controlling-pneumatics $h$.

An air trunk or conductor C' leads from the pneumatic chest C to the wind-chest $m$ and thence by suitable passages into the bellows, (see Figs. 6 and 9,) by which the air in the chamber surrounding the pneumatics is exhausted. The passage into said air-trunk is provided with a valve G', opened by a suitable spring and closed by a lever $G^2$, connected with the mechanism which shifts the music-operating appliances into and out of gear for winding and rewinding the sheet, so that said valve G' is thereby closed to prevent exhaustion of air within the pneumatic chest while rewinding the music-sheet, and again permitted to open when the winding-gear is thrown into engagement. At the end of the chest C there is an opening into the leader F', having an inwardly-opening valve $F^2$, connected with a yielding spring-pressed lever $F^3$, (see Fig. 16,) that tends to close the valve in opposition to the inflowing air. By varying the resistance of the lever on the valve the air in the leader is given greater or less tension for filling the pneumatics F, causing said pneumatics to act with greater or less force and promptness, thus moving the action to strike a harder or softer blow upon the piano-strings. When the resistance of the lever or spring is increased, less air is supplied to the pneumatics, which then act with less vigor, and a lighter stroke of the hammers is effected upon the strings than when the inlet-valve $F^2$ is permitted to open with its normal degree of resistance. The purpose and general operation of this resistance-valve F² is substantially similar to that described in my prior patent, No. 470,323, but the structure and means for its control are herein different from that of the prior patent.

A feature of this invention is the automatic playing-action arranged at the front of the piano-action A, within the space between said piano-action and the desk or front casing a', above the manual-keys K, and the manner of combining the same with the pneumatic operating mechanism at the back of the piano. This automatic action is preferably constructed as follows: A support or frame L, composed of suitable uprights and longitudinal guide-bars, is secured in the piano-case. Upon said frame there are carried a series of automatic keys or levers 5, (see Fig. 8,) pivoted or fulcrumed in suitable supports on said frame in a manner to swing with an upward and downward movement and arranged to respectively engage at their rear ends beneath the front ends of the rockers 6 or tilting members that carry the hammer-actuating jacks of the piano-action, (see Figs. 4 and 5,) but operatively disconnected from said rockers except when in contact of action. Standing upon or engaging with the front ends of said automatic keys there are a series of upright rods or operators 8, that extend upward toward the top of the piano and are respectively supported in guides L' on the frame L, to have free endwise movement for depressing the front ends of the automatic keys, and thereby throwing up their ends to lift the rockers or tilt-blocks 6, and thus operate the hammers in the piano-action. For imparting motion to said rods 8 and automatic keys from the pneumatically-actuated puppets J a series of cranked wires or levers N are arranged across the top of the piano above the metal frame and below the cover-board, (see Figs. 2, 4, 5, and 7,) the cranked wires or levers being supported or fulcrumed to rock freely in bearings upon the top of the piano-frame or in an auxiliary frame 12 arranged thereon. The rods 8 are preferably provided at their upper ends with adjusting-buttons 9 for regulating the exact length, as required. The crank ends n of the levers N respectively rest, one upon the button of the rod 8 and the other upon the button at the top of the puppet J, the arrangement being such that elevation of the puppet J will depress rod 8, or vice versa. In practice the number of automatic keys 5 corresponds in series with the number of manual-keys and hammers in the piano-action, or such portion thereof as may be included in the automatic or combined action, each of said automatic keys being provided with a similar individual set of operating devices comprising the rod 8, lever N, puppet-stud J, angle-wire I, and pneumatics F and h, each set being independently operative and respectively connected for control with the air-inlet ducts of the tracker B, as will be readily understood by persons conversant with automatic musical instruments.

The rear ends of the keys 5 are preferably weighted or loaded with blocks of lead 7, inserted therein, as indicated in Fig. 8, to give the key preponderance at the rear end; or, if desired, springs may be used in combination with said keys for imparting a backward tilt thereto.

The frame L is removably attached within the piano-case, so that said frame, together with the operator-rods, automatic keys, and other mechanism attached thereto, can be readily removed at any time for giving access to the piano-action, said frame being retained by stay-pins, buttons, hooks, or other suitable detachable fastenings. The frame 12 is best made removable, together with levers N, or so as to draw out at the front for removing the entire series of levers to facilitate tuning the piano.

In some instances, if preferred, in lieu of extending the levers or rocker-wires N to rest directly upon the heads of the rods that stand upon the automatic keys, as shown in Fig. 4, I employ auxiliary rockers, as N', and shorter operator-rods 88, as indicated in Fig. 5, the auxiliary rods and rockers being supported upon a bar or guide-frame L², hinged to the frame L and removable therewith. The operation or action in this instance is substantially the same as though the lever N acted directly on the rod 8. This latter modification permits the convenient tuning of the piano-strings simply by removing the frame L and parts carried thereby without withdrawing the frame 12 and levers N.

By arranging the automatic action in front of the piano-action, above the manual and in rear of the removable desk or front of the case, the automatic mechanism is rendered conveniently accessible, can be attached to a piano with facility, its parts easily adjusted at any time as desired, and its frame being detachably secured in the piano-case the automatic action can be readily removed to afford access to the piano-action and strings and as readily replaced when desired; also, by disposing the pneumatic chest at the rear of the piano and arranging the connecting levers or rockers that transmit motion from the pneumatic puppets to the automatic key-operating rods across the head of the piano above the metal frame the mechanism can be applied to a piano with practical facility and without cutting into the sound-board or frame to accommodate the rockers or connecting-levers, while the pneumatic chest is away from interference with the sounding-strings and conveniently in position for direct communication with the overhead tracker and the wind-inducing mechanism.

As a feature of this invention it will be observed that the automatic action is entirely independent of the manual-keys, the engagement being made with the hammer-throwing mechanism, so that such manual-keys do not move when the automatic mechanism is in operation; also, that the automatic action is operatively unconnected with the piano-action when idle, so that there is no interference with the free playing of the piano manually nor any movement of the automatic devices by the manual-keys.

Between the automatic keys 5 and manual-keys K, I arrange a key-lock device. This consists of a bar or frame 15, hung upon the frame L by suitable links or guides 10, so as to rise and fall by the swinging of the links. When in elevated position, the top edge of the lock-bar supports the automatic keys 5 in elevated alinement, leaving the manual-keys free for action, and when the lock-bar is depressed its lower edge rests upon and holds the manual-keys immovable, leaving the automatic keys free for operation. A suitable spring 11 is combined with this key-locking bar for elevating and normally maintaining it in position beneath the automatic keys, as shown in Fig. 1. This locking-bar is provided with an operating-rocker 17, joined by suitable moving connections 16 and 18 (see Fig. 13) with a pneumatic motor device O, the interior of which communicates, as at O', with the chamber C, in which the pneumatics F are arranged, so that when the air in said chamber is exhausted by the influence or action of the bellows the pneumatic O closes and forces forward the connections 16 and 18, turning down the rocker 17, thereby automatically depressing the locking-bar upon the manual-keys by pneumatic action, said pneumatic O retaining said locking-bar depressed so long as the pneumatic chamber is exhausted—that is, while the automatic action of the instrument is in operation. As soon as the exhaustion of air in the pneumatic chamber C ceases the pneumatic O collapses, releasing the connections 16, and allowing the lock-bar to be raised by its spring to rest in normal position beneath the automatic keys 5. The arrangement in a combination-piano of means for automatically locking the keys is an important feature of my invention.

The pneumatic for automatically controlling the key-locking devices is relieved from the bellows influence when the valve is closed for rewinding the music-sheet. Consequently the key-locking bar assumes its normal position against the automatic keys 5 and releases the manual-keys during the rewinding operations, thus preventing any rattling of the automatic operating mechanism and also permitting of the playing of the piano manually during the time of rewinding, if desired.

At the front of the key-table $a$ finger-keys P are provided for controlling the expression mechanism. (See Figs. 11 and 14.) Said finger-keys are preferably made as cranked rods or levers fulcrumed beneath the bed $a$ and having projecting front ends that are properly shaped for use as keys to be advantageously manipulated with the fingers, while the rear ends of such key-rods connect with the parts to be operated thereby. One of said finger-keys through its rod P' actuates a lever 21 for lifting the pedal-pitman 22, whereby the hammer-rest rail 23 is raised, one end of the lever 21 being depressed by the cranked end of rod P' and its other end engaging a collar fixed on the pedal-pitman. A second one of said finger-keys through its rod $P^2$ actuates a lever 24, that is fulcrumed on the bed $a$, with its opposite end engaging a collar fixed on the pitman 25, that works the retracting devices of string-dampers 26 at the bass end of the piano-action, while another finger-key has its rod $P^4$ combined in similar manner with a lever 27, that operates the pitman 28 and dampers at the treble end of the piano-action. Another of said finger-keys P has its cranked rod $P^3$ connected by a bar 29, cranked shaft 30, and lifter 31 with a cranked rocker 32, that engages the lever $F^3$ of the resistance-valve $F^2$, which controls the air-inlet to the leader F' for flushing the operating-pneumatics F, (see Figs. 16 and 17,) so that by pressing the finger upon said finger-key the rocker 32 is caused to press inward the lower end of the lever $F^3$, causing the spring 34 to act with greater force against the upper hinged part of the lever, giving greater tension thereon for closing the inlet-valve, thereby partially reducing the supply of air, so that the pneumatics F inflate with a weaker or less prompt action.

The finger-keys P preferably have combined therewith a ledge or plate $r$, fixed on the piano-front, upon which to rest the thumb and gain support to assist the fingers in manipulating the keys. If in any instance desired, these finger expression-keys P can be arranged with their ends standing upward through or near the keyboard margin in front of the manual-keys (see Fig. 15) at convenient position to be pressed with the finger for working the lever disposed beneath the key-bed.

The means for throwing the music-winding mechanism into and out of operation is illustrated in Figs. 11 and 12, and comprises a rod 36, having a pull-knob at the front of the instrument and an incline or connection at its rear end that works a rocker 38 and lifter 39, which engages beneath the upright bar V, to which are connected the cranked rod $G^2$, that closes the cut-off valve G', and a cranked rocker 40, that engages a swinging arm 42, the slotted end of which embraces a flange fixed on the drive-shaft T in a manner to give endwise movement of said shaft for shifting the pinion $t$ into and out of mesh with the gear on the winding-drum Q, accordingly as the pull-rod 36 is moved backward or forward.

The motor or air engine M may be of any suitable or well-known construction, pneumatically operative for imparting rotary motion to the shaft M'—for instance, such as described in Letters Patent No. 355,201, heretofore granted me. The motor-shaft is provided with a suitable pulley $u$, from which the driving-belt $T^3$ runs to the pulley $T^2$ upon the shaft $T$ for operating the music-winding mechanism.

$Y$ indicates a quick-running balance-wheel operated by a belt from a pulley on the motor-shaft for steadying the motor-action in well-known manner.

The wind-chest upon which the motor is supported is divided by a partition $w$ into two separate chambers $m$ and $m'$, (see Fig. 10,) one of which communicates direct with the bellows, while the other communicates with the regulator-pneumatic $R$ and thence to the bellows. The exit-chamber of the motor has an air-passage $x$ into the chamber leading to the regulator and a somewhat larger passage $x'$ into the chamber $m$, which communicates direct with the bellows $D'$, and both of said passages $x$ and $x'$ are controlled by a single slide or valve 43, arranged as shown in Figs. 10 and 11, this valve having an opening through it for uncovering the passage $x'$. Said valve is connected by a rod with a swing-lever 45, a link 44, and angle-lever 46 with a pull-rod 47, that extends to the front of the instrument, (see Fig. 11,) and is furnished with a knob or handle for conveniently moving the valve as desired. The regulator comprises a collapsible pneumatic through which the air passes and a valve 49 automatically moved by said pneumatic and arranged to open and close the air-passage between the pneumatic motor and the bellows, as shown in Fig. 11. A regulator of this class is the subject of prior Letters Patent No. 473,338. When the automatic action is playing, the air from the motor passes through the small opening $x$, thence through the regulator $R$, which controls and renders uniform the speed of the motor, and thence to the bellows. The size of the opening $x'$ can be varied by closing the valve 43 more or less, thus giving greater or less speed.

When the operation is to rewind the music-sheet, the valve 43 can be shifted so as to open the larger passage $x'$, giving direct communication with chamber $m$ and utilizing the full exhaustive action of the bellows, so that the motor will operate with its greatest degree of speed, accelerating the movement of the shaft $T$, so as to rewind the music upon its spool with despatch.

The horizontal frame or base $E'$, to which the blow-pedals are hinged, is arranged to slide under the bottom of the piano, supported by grooved cleats or guideways $E^2$, so as be moved in and out like a drawer, the pedal taking an upright position at the front of the case when the base is moved back, as indicated by dotted lines in Fig. 5. The upper end of the pedal is connected by a link $e^2$ to the forward end of the sector or lever $e$, which is formed with a forwardly-projecting end carrying a pivoting-stud for the link.

In some instances, if it is desired that the blow-pedals should be near together, the construction can be modified, as indicated in Figs. 19 and 20, the link $e^2$ being formed with a hook at its end and connected to the sector or its stud, so that it can be detached therefrom and the pedal let down upon the base, as indicated in dotted lines, Fig. 20, and both the base and pedal then slid backward beneath the piano-body, as indicated in full lines, Fig. 20.

The operation of this automatic piano is as follows: The spool containing the perforated music-sheet is adjusted in its bearings at the top of the piano and the loop at its end hooked to the stud of the winding-roll in well-known manner. The blow-pedals are drawn out from beneath the piano and the instrument is then in condition for action. The music-operating pinion $t$ is thrown into engagement and the valve $G'$ opened by pressing back the pull-bar 36. The motor-valve 43 is then opened to the position shown in Fig. 10 by means of the pulley 47. Then by operating the bellows with the feet upon the blow-pedals air from the motor exhausts through the regulator $R$ and the motor-engine turns the shaft $M'$ and music-winding roll $Q$, thereby advancing the perforated music-sheet over the tracker-ducts. The bellows-action also exhausts the air in the pneumatic chamber, so that as the tracker-ducts are opened the controlling-pneumatics move the valves $G$ in accordance with the perforations, letting air from the inlet-leader $F'$ into the operating-pneumatics $F$, inflating said pneumatics and thereby moving the levers $I$ and puppets $J$, lifting the rear ends of the cranked wires or levers $N$, the front ends of which depress the rods 8 upon the automatic keys 5, which in turn throw up the rockers and jacks, causing the hammers to strike against the strings, the respective notes being sounded according to the location and extension of the perforations in the music-sheet. As the playing proceeds the expression is controlled, as desired, by actuating the respective keys $P$ at the front of the key-table with the fingers, which can be easily accomplished, the hand being supported by resting the thumb upon the ledge $r$, thus giving advantage in lifting said keys. Immediately as exhaustion commences in the chest $C$ the pneumatic $O$ is collapsed, causing the key-lock 15 to release the automatic keys 5 and to secure the manual-keys $K$, as before described. When the music-sheet has run through and is to be rewound, the pull 36 is pressed back, closing the valve $G'$ and disengaging the pinion $t'$ from the winding-roll gear by endwise movement of the shaft $T$. The motor-valve 43 is then shifted for opening the larger passage $x$ into the wind-chest $m$ and bellows $D'$, causing the motor to be rapidly operated with full force of the bellows, and thus quickly rewinding the sheet. The pneumatic $O$ during such rewinding is relieved from exhaustion and thus allows the key-lock to take its normal position beneath the automatic keys 5, holding them immovable while the rewinding is effected.

I claim as my invention, to be secured by Letters Patent—

1. In a piano, the combination with the piano-action, of automatic-action mechanism for operating said piano-action, comprising a series of operators or devices for individually actuating the piano-hammers, carried upon a suitable support disposed within the piano-case above the manual-keys, in rear of the desk or front casing and in front of the piano-action, said automatic-action mechanism engaging with the hammer-throwing devices of the piano-action, and independent of the manual-keys, substantially as set forth.

2. In a piano, in combination with the piano-action, an automatic-action mechanism disposed in front of the piano-action, and engaging with said piano-action above the manual-keys, and a removable supporting-frame carrying said automatic action, detachably secured within the piano-case in rear of the desk or front casing, substantially as set forth.

3. In combination with the piano-action having the hammers, and swinging rockers that carry the hammer-throwing jacks, an automatic action provided with a supporting-frame at the front of the piano-action, and having fulcrumed thereon, adjacent to said rockers, a series of centrally-pivoted keys or levers that act against said rockers for throwing up the hammers, reciprocating rods engaging with said pivoted keys, connections for moving said rods, and a pneumatic operating and controlling mechanism, substantially as set forth.

4. The combination with the piano-action, of the automatic action disposed in front of the piano-action, and having the upwardly-extending operator-rods, a series of cranked rocking wires or levers arranged above and extending over the piano-head frame engaging said rods, and a pneumatic mechanism disposed at the back of the piano for imparting motion automatically to said levers for operating the piano-action, substantially as set forth.

5. The combination with the piano-action, of the removable supporting-frame having suitable supporting-bars, the series of automatic keys pivoted or fulcrumed on said frame, their rear ends adapted for engaging beneath the hammer-jack rockers of the piano-action; the series of endwise-movable rods arranged in said supporting-bars, with their lower ends standing upon said automatic keys, said rods provided with adjusting-buttons, the series of cranked levers at the piano-head, their front ends acting upon the rods, the pneumatic actuating mechanism engaging the rear ends of said levers, a music-winding mechanism and a perforated music-sheet for controlling the pneumatic actuating mechanism, substantially as set forth.

6. In an automatic piano, in combination with an automatic action at the front and operating mechanism at the rear of the piano-frame; a series of levers or rocker-shafts for transmitting motion across the top of the piano, and a removable bearing-frame supporting said series of transmitting-levers, adapted for the simultaneous removal or replacement of the entire series of said levers, for the purpose set forth.

7. In a combination-piano having the manual-keys, and a series of automatic keys or devices adapted for independently playing the piano-action, the combination, with said manual and automatic keys, of a key-lock or means for the alternate engagement of said manual-keys, or the automatic keys, whereby one series of said keys is retained immovable while the other series is in use.

8. The combination, with the piano-action, the manual-keys and the automatic action having keys or devices that operate said piano-action independent of said manual-keys, of a key-locking bar or frame normally sustained in conjunction with said automatic keys, suitable connections for shifting said key-locking bar to and from the manual-keys, and a pneumatic operator therefor collapsible and inflatable by air-pressure under influence of or induced by the bellows-action, substantially as set forth.

9. The combination, of the piano-action, the manual-keys, the automatic keys independently engaging the piano-action, the pneumatic chest having the operating and controlling pneumatics therein, suitable connections for moving said automatic keys from said operating-pneumatics, the key-locking bar movably suspended between the lines of manual and automatic keys, a rocker-shaft and connections adapted for shifting or depressing said key-locking bar, a pneumatic operator therefor having its chamber communicating with the interior of the chest containing the action-operating pneumatics, the bellows mechanism and connections for exhausting air from said wind-chest, substantially as set forth.

10. The combination with the wind-chest containing the operating-pneumatics, the valve for controlling the air-inlet opening thereinto, and the yielding resistance-lever connected with said valve, of a rocker or angle lever acting against the arm of said resistance-lever, suitable connecting devices for imparting motion to said rocker, and an actuating rod or lever for operating said parts, having a finger-key at or beneath the front of the key-table, substantially as set forth.

11. The combination with the finger-keys disposed beneath the key-table at the front of the manual-keyboard for working expression mechanism in an automatic piano-action, of a stationary ledge or thumb-rest adjacent to said finger-keys, for the purpose set forth.

12. In an automatic piano, in combination with the music-sheet winding and rewinding mechanism, the pneumatic motor-engine with connections for operating the same, the air-exhausting bellows, a motor-exhaust wind-chest having separated chambers therein, a larger and a smaller exit-passage from the motor into said respective wind-chest chambers, the slide or controlling valve having a passway therethrough, said valve adapted to open one or both of said exit-passages, and suitable valve-operating connections provided with a handpiece or pull at the front of the piano, for the purpose set forth.

13. In an automatic piano, in combination, the pneumatic motor-engine, the air-exhausting bellows, an intermediate chest or windway having two separated air-chambers, one connected direct with the bellows, the other unconnected therewith, a pneumatic regulator provided with a windway from said latter chamber, and a windway into the bellows, exit air-passages from the motor-engine into the respective chambers, the slide or valve adapted for controlling both said passages, and the valve-operating connections having a handle at the front of the instrument, for the purpose set forth.

14. The combination, substantially as described, of the music-winding rolls, the operating-shaft T therefor, the shifting-arm 42, the pneumatic chest C, its cut-off valve, the upright rod V, the cranked rockers 40 and $G^2$ both connected with said rod and respectively acting on said shifting-arm and cut-off valve, the lifter 39, its rocker 38 and pull-rod 36 having the incline, for the purpose set forth.

15. In a combined or automatic piano, in combination with the piano-body, bellows, bellows-exhauster and its operating connection; the swinging sector-lever having the forwardly-projecting end provided with a stud or button, and the blow-pedal hinged to its supporting-bed and having at its upper end a pivoted link adapted to hook onto said stud and detachably connect said pedal with the sector-lever, and the pedal-supporting base adapted to slide beneath the piano-body, substantially as and for the purpose set forth.

Witness my hand this 12th day of June, A. D. 1895.

WILLIAM D. PARKER.

Witnesses:
C. L. PIERCE,
EDWARD H. WHITE.